July 19, 1938.  E. GRAY  2,124,334
VALVE MECHANISM
Filed Oct. 5, 1936   2 Sheets-Sheet 1
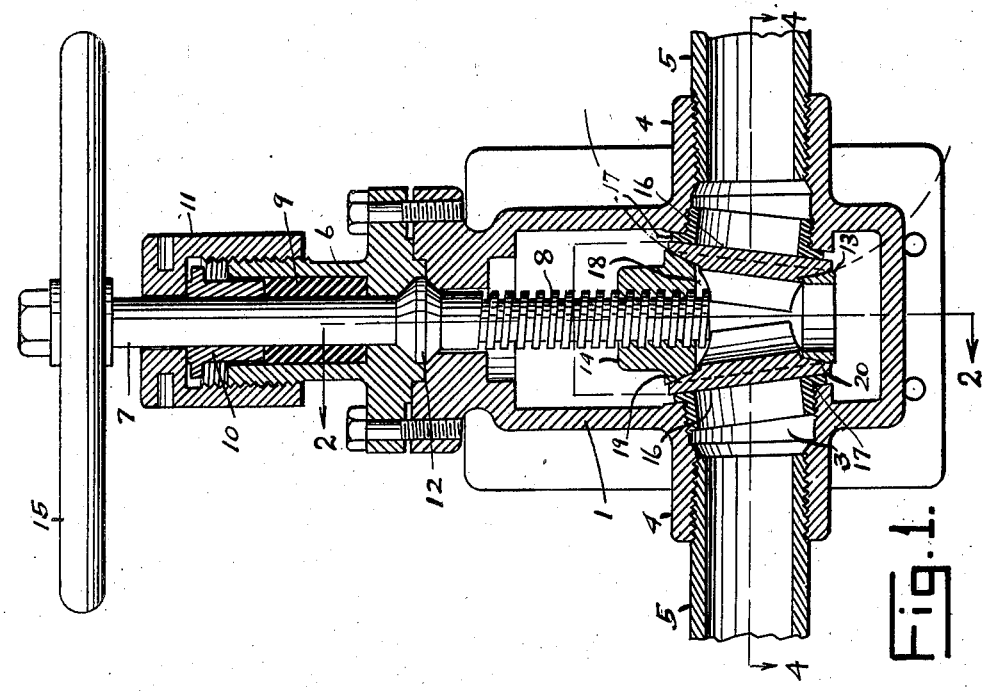
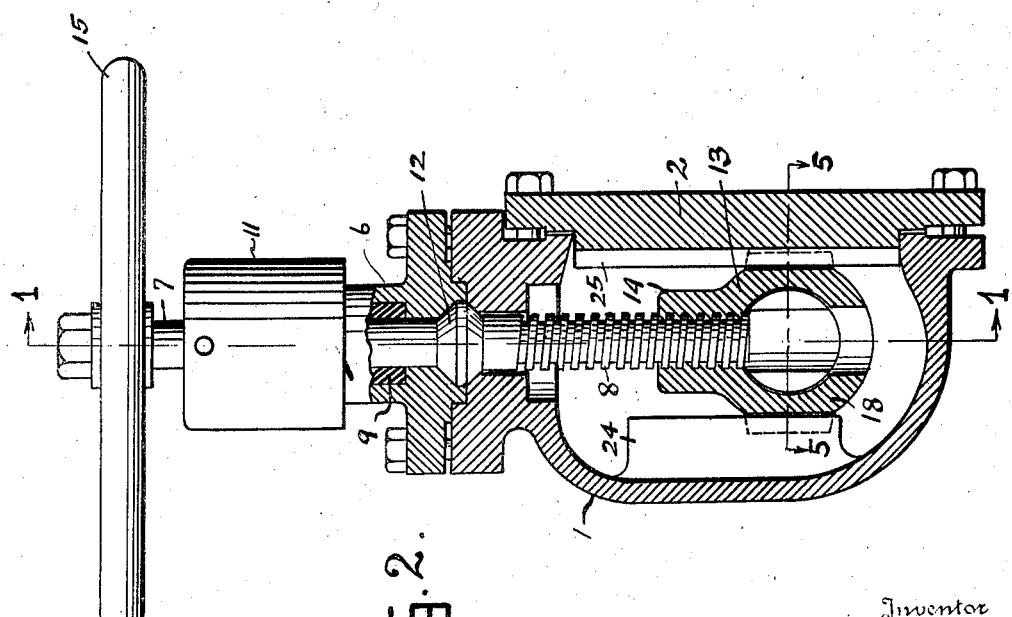
Inventor
Ellsworth Gray
By Edward V. Hardway
Attorney July 19, 1938. E. GRAY 2,124,334
VALVE MECHANISM
Filed Oct. 5, 1936 2 Sheets-Sheet 2

Inventor
Ellsworth Gray
By Edward V. Hardway
Attorney

Patented July 19, 1938

2,124,334

UNITED STATES PATENT OFFICE 2,124,334

VALVE MECHANISM

Ellsworth Gray, Houston, Tex., assignor to C. C. Brown, Houston, Tex.

Application October 5, 1936, Serial No. 104,042

2 Claims. (Cl. 251—59).

This invention relates to a valve mechanism.

An object of the invention is to provide a valve mechanism of the character described specially designed for controlling the flow of liquid through pipes or other conduits and particularly through conduits wherein the fluid is conducted under high pressure.

It is another object of the invention to provide a valve mechanism of the character described having a casing and a flow-way through the casing with confronting seats about the flow-way and a valve assembly embodying opposing valves mounted in a novel manner in a movable frame said valves being readily adjustable to readily conform to the position of and to fit closely against the seats when the valves are in closed position.

It is another object of the invention to provide, in a valve mechanism, a novel type of valve assembly having the valves flexibly mounted in a movable framework whereby the valves may readily accommodate themselves to the valve seats and form a close fit therewith to prevent leakage.

A further feature of the invention resides in the provision of a novel type of casing having a removable side plate for ready access to the interior of the mechanism for inspection, when the valves are closed.

With the above and other objects in view the invention has particular relation to certain novel features of construction, operation and arrangement of parts, an example of which is given in this specification and illustrated in the accompanying drawings wherein:—

Figure 1 shows a sectional view of the valve mechanism taken on the line 1—1 of Figure 2.

Figure 2 shows a sectional view taken on the line 2—2 of Figure 1.

Figure 3:
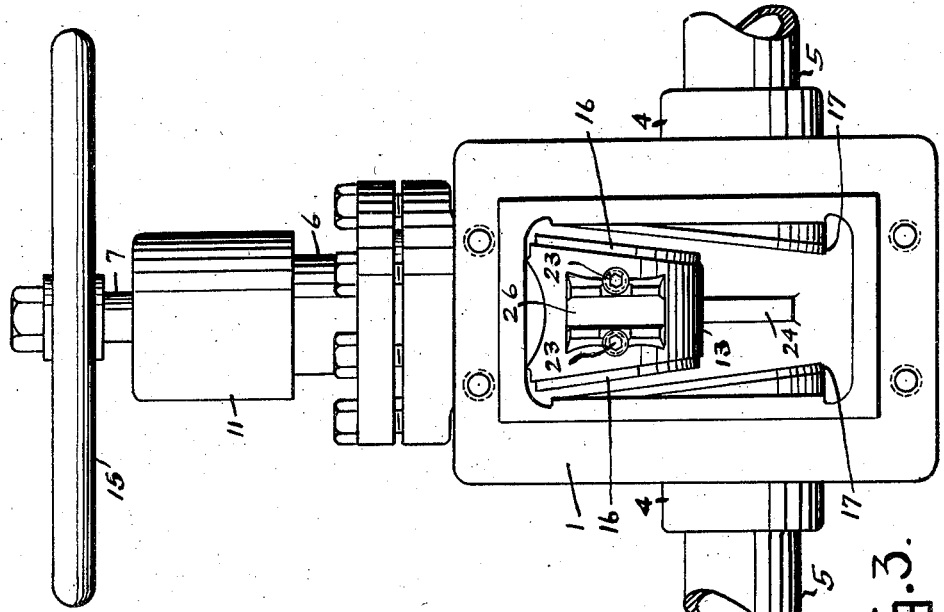
Figure 3 shows a side elevation showing the cover plate removed.
Figure 4:
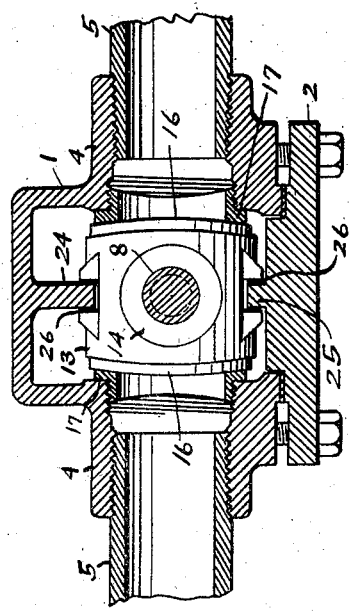
Figure 4 shows a transverse sectional view taken on the line 4—4 of Figure 1.

Referring now more particularly to the drawings wherein like numerals of reference designate similar parts in each of the figures the numeral 1 designates the valve casing one side of which is closed by the removable side plate 2 which is bolted or otherwise removably secured to the side of the casing so as to form a fluid tight joint therewith.

The casing is formed with a flow-way 3 therethrough and has the tubular connections 4, 4, for the attachment of adjacent sections 5, 5, of a flow line thereto.

Bolted or otherwise secured to the casing there is a bonnet 6 and a rotatable valve stem 7 extends through the bonnet into the casing and has its inner end 8 externally and coarsely threaded. Within the bonnet around the stem there is the packing 9 and abutting the outer end of the packing and surrounding the stem there is a gland 10 which is maintained in place by the flange nut 11 which is screwed on to the bonnet and through which the stem extends.

The stem is provided with an external annular rib 12 which is confined by the casing and bonnet whereby the stem is mounted to turn but is confined against endwise movement.

Within the casing there is a tubular frame 13 through which the inner end of the stem works and said frame has an extended sleeve 14 which is internally threaded to receive the threads at the inner end 8 of the stem 7.

The outer end of the stem has a hand wheel 15 fixed thereon by means of which the stem may be turned and the frame adjusted to active or inactive positions as will be hereinafter explained.

On opposite sides of the frame are the valves 16, 16, having the outer plane faces which converge from the sleeve end of the frame and which are adapted to move into and out of cooperating relation with the inside removable valve seats 17—17 within the casing and surrounding said flow-way 3.

Figure 5:
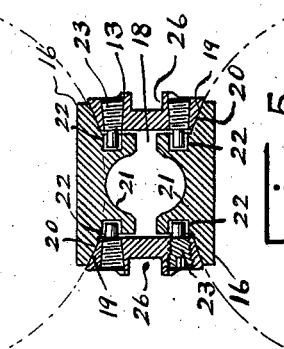
Figure 5 shows a sectional view taken on the line of 5—5 of Figure 2.

The frame 13 has a transverse passageway or opening 18 therethrough which is surrounded, on opposite sides of the frame, by the annular faces 19, 19, said faces 19 describing an annular segment of a sphere as indicated by the dotted line in Figure 5. The valves 16 have the inside annular faces 20 which are shaped to conform to the contour of, and to fit closely against, the faces 19.

It will be observed from an inspection of Figure 5 that the valves have their midportions 21 thickened, or extended inwardly and provided with the side sockets 22, 22. Retaining pins 23, 23, are screwed through the walls of the frame 13 and have their inner ends blank and projecting into the sockets 22 loosely whereby the valves are flexibly connected to the frame.

Between the seats 16 there are the inside ribs 24, 25 the former of which is formed on the inside of the casing and the latter of which is formed on cover plate 2 and the frame has oppositely disposed grooves 26, 26, which receive these ribs. The ribs form guides for guiding the frame as it moves to active or inactive positions.

Upon rotation of the stem 7 in one direction the frame, with the valves thereon, will move to inactive position away from the valve seats to permit the flow of liquid through the flowway 3. Upon rotation of the stem 7 in the direction the frame, with the valves thereon, will be moved to active position with the outer faces of the valves seating firmly against the seats 17. The valves being mounted loosely on the frame and the contacting faces 19, 20, being of the shape of a spherical segment and being in close contact said valves will automatically adjust themselves on the frame in position to seat closely against the seats 17 irrespective of the misalignment of said seats.

When the valves are closed the cover plate 2 may be removed and the interior working parts of the valve inspected without wastage of the fluid being conducted through the line.

The drawings and description disclose what is now considered to be a preferred form of the invention by way of illustration only, while the broad principle of the invention may be defined by the appended claims.

What I claim is:

1. A valve mechanism comprising a casing having a passageway for liquid therethrough, valve seats around the passageway and spaced apart, a valve assembly movable into active position to close the seats and into inactive position to clear the seats to open the passageway, said assembly comprising a tubular frame, valves on opposite sides of the frame, the mid-portions of the valves being inwardly thickened and provided with side sockets, retaining pins extended inwardly from the walls of the frame and projecting into the sockets loosely whereby the valves are flexibly connected to the frame, said frame having annular faces on opposite sides thereof, each face describing an annular segment of a sphere and the valves having inside, annular faces which are shaped to conform to the contour of and to fit closely against the frame faces.

2. A valve mechanism comprising a casing having a passageway for liquid therethrough, valve seats around the passageway and spaced apart, a valve assembly movable into active position to close the seats and into inactive position to clear the seats to open the passageway, said assembly comprising a tubular frame, valves on opposite sides of the frame, the mid-portions of the valves being inwardly thickened and provided with side sockets, retaining pins extended inwardly from the walls of the frame and projecting into the sockets loosely whereby the valves are flexibly connected to the frame, said frame having annular faces on opposite sides thereof, each face describing an annular segment of a sphere and the valves having inside, annular faces which are shaped to conform to the contour of and to fit closely against the frame faces, and means for moving the assembly.

ELLSWORTH GRAY.